United States Patent
McGee et al.

(10) Patent No.: US 7,426,189 B2
(45) Date of Patent: Sep. 16, 2008

(54) NETWORK CONTROLLER

(75) Inventors: Michael S. McGee, Round Rock, TX (US); Michael S. McIntyre, Austin, TX (US); Gregory T. Howard, Cedar Park, TX (US); Mark R. Enstone, Austin, TX (US); Mark C. Stratton, Georgetown, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 895 days.

(21) Appl. No.: 10/620,208

(22) Filed: Jul. 15, 2003

(65) Prior Publication Data

US 2005/0038878 A1    Feb. 17, 2005

(51) Int. Cl.
*H04L 12/28* (2006.01)

(52) U.S. Cl. .................. 370/254; 709/220

(58) Field of Classification Search .......... 370/241, 370/242, 245, 248, 250, 254–258, 389, 392; 709/218, 220–226, 238, 249–250
See application file for complete search history.

(56) References Cited

U.S. PATENT DOCUMENTS

| | | | |
|---|---|---|---|
| 6,101,528 A * | 8/2000 | Butt | 709/203 |
| 6,229,538 B1 | 5/2001 | McIntyre et al. | 715/734 |
| 6,272,113 B1 * | 8/2001 | McIntyre et al. | 370/248 |
| 6,381,218 B1 | 4/2002 | McIntyre et al. | 370/245 |
| 6,765,877 B1 * | 7/2004 | Foschiano et al. | 370/250 |
| 6,895,429 B2 * | 5/2005 | Banga et al. | 709/215 |
| 2003/0023727 A1* | 1/2003 | Hunt et al. | 709/225 |
| 2003/0055946 A1* | 3/2003 | Amemiya | 709/224 |
| 2004/0223501 A1* | 11/2004 | Mackiewich et al. | 370/401 |

* cited by examiner

*Primary Examiner*—Ricky Ngo
*Assistant Examiner*—Pao Sinkantarakorn (57) ABSTRACT

A network controller system comprising a plurality of network ports and a driver system that operates the plurality of network ports. The driver system determines which of the network ports can be combined together to form a team. Each network port in the team is associated with a different network interface card (NIC). The NICs are associated with a common network address to be used by external network logic.

28 Claims, 5 Drawing Sheets

NETWORK CONTROLLER

BACKGROUND

Computers and other devices may be networked together using any one of a variety of architectures and any one of a variety of corresponding and compatible network protocols. An exemplary network architecture may include Ethernet. In at least some networked computers, the computer may include one or more network interface cards or controllers ("NICs"). Each NIC may include one or more connectors for interfacing to a compatible network connection. Via the NIC, the computer may couple to a central network device such as a repeater, hub, switch, or router.

Some computers may have multiple NICs thereby permitting a group of NICs to be "teamed" together. A team of NICs may have a single address (e.g., an Internet Protocol ("IP") address) which facilitates communication through the team of NICs. To other logic and drivers, the team of NICs may appear as a single NIC. Not all NICs in a computer can or should be teamed together. For example, two NICs that are connected to different networks should not be teamed together.

Thus, it is desirable to ensure that a group of NICs that a user might desire to team together can be legitimately teamed together. Further, because network configurations may change, it may be desirable to verify that the NICs that are operated in an existing team continue to be eligible to be operated within their team.

BRIEF SUMMARY

At least some of the issues mentioned above may be addressed by apparatus and methods that determine which ports in a system can be combined together to form a team and/or whether ports that are already operated as part of a team are eligible to continue to be operated in the team.

In accordance with some embodiments, a network controller system may comprise a plurality of network ports and a driver system that operates the plurality of network ports. The driver system may determine which of the network ports can be combined together to form a team.

In accordance with other embodiments of the invention, a computer system may comprise a processor and a plurality of ports coupled to the processor. The ports may be adapted to connect to a network. The network to which one port connects may be the same or different as the network to which another port connects. In such a system, at least two of the ports may be operated as a team. The system may also include logic that is coupled to the ports which may determine whether the ports in the team may continue to be operated in the team.

BRIEF DESCRIPTION OF THE DRAWINGS

For a detailed description of the embodiments of the invention, reference will now be made to the accompanying drawings in which.

NOTATION AND NOMENCLATURE

Certain terms are used throughout the following description to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either an indirect or direct connection. Thus, if a first device couples to a second device, that connection may be through a direct connection, or through an indirect connection via other devices and connections. As used herein, the term "port" broadly includes network interface cards or controllers ("NICs"), NIC drivers and other hardware and software resources associated with the operation of a NIC or other device which consequently provides an electronic system with connectivity to one or more networks. Further, the term "system" generally refers to one or more components coupled together to provide one or more functions.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. The following discussion is directed to an embodiment of the invention in the form of a computer system, but may readily apply to any type of electronic system that couples to a network via a plurality of network connections.

Figure 1:
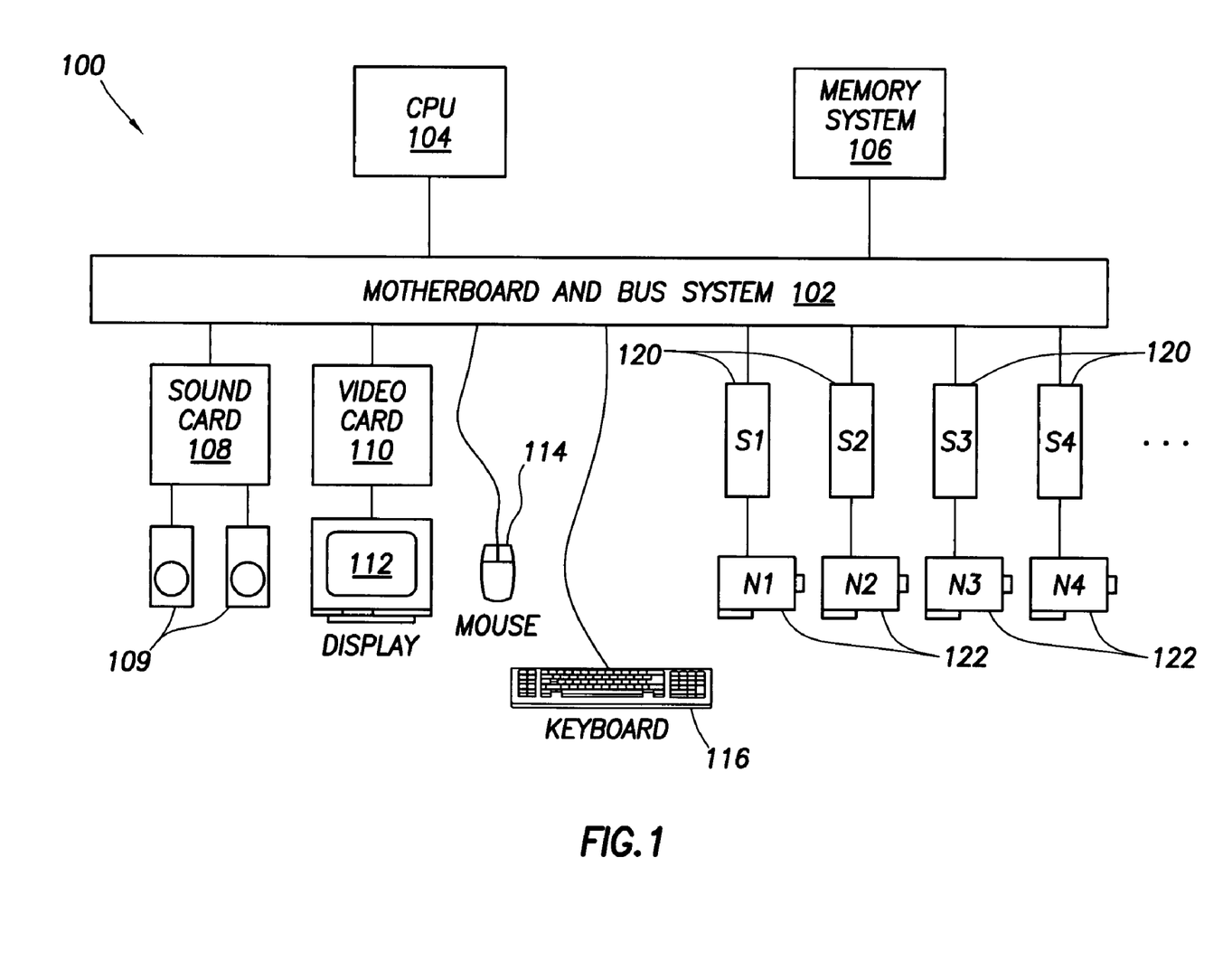
FIG. 1 is a block diagram of an exemplary computer system used in conjunction with various embodiments of the invention.

FIG. 1 is a block diagram of an exemplary computer system 100 that is used to illustrate various aspects of a network system implemented according to various embodiments of the present invention. The computer system 100 may comprise any type of computer (e.g., a server or personal computer) and may include a motherboard and bus system 102 coupled to at least one central processing unit ("CPU") 104, a memory system 106, a sound card 108, speakers 109, a video card 110, a display 112, a mouse 114 and a keyboard 116. The input and output devices (display 112, mouse 114, keyboard 116) may permit a user to interact with the computer system 100 and its software for purposes of controlling the network interface functionality provided in the system, as further described below, as well as other functionality implemented in the system 100. The motherboard and bus system 102 may include various types of bus system configurations including one or more busses and corresponding bus driver circuitry and bridge interfaces (not specifically shown). The memory system 106 may include a memory controller and be implemented with one or more memory boards (not shown) plugged into compatible memory slots on the motherboard, although numerous memory configurations are possible. Additional components, devices and circuitry (not specifically shown) also may be included in the computer system 100 including one or more storage devices (e.g., floppy drives, hard drives, CD ROMs).

The motherboard and bus system 102 may be implemented with one or more expansion slots 120, individually labeled S1, S2, S3, S4. Each of the slots 120 may be configured to receive compatible adapter or controller cards configured for the particular slot and bus type. Such cards may include network interface cards ("NICs"), disk controllers such as a SCSI (Small Computer System Interface) disk controller, and memory cards. The computer system 100 may include one or more of several different types of buses and slots, such as a Peripheral Component Interconnect ("PCI") bus. In the embodiments shown, a plurality of NIC adapter cards 122, individually labeled N1, N2, N3 and N4, are shown coupled to the respective slots S1-S4. The slots 120 and the NICs 122 may be implemented according to the PCI standard or other suitable standard.

As described more fully below, each of the NICs 122 may permit the computer system 100 to communicate with other devices on one or more corresponding networks. The computer system 100 may be coupled to at least as many networks as there are NICs 122, or two or more of the NICs 122 may be coupled to the same network via a common network device, such as a hub or a switch. When multiple NICs 122 are coupled to the same network, each may provide a separate and redundant link to that network for purposes of, for example, fault tolerance or load balancing, otherwise referred to as "load sharing." Each of the NICs 122 (N1-N4), may communicate using packets, such as Ethernet packets, or other suitable communication mechanisms. Destination and source addresses may be included in each packet to permit the packets to be transmitted correctly from source to destination. A directed ("unicast") packet may include a specific destination address to receive the packet. A broadcast ("multicast") packet may be transmitted to a plurality of destinations and thus generally does not specify a single specific destination address. One or more bits may be set in the packet to specify a unicast transmission or a multicast transmission.

Figure 2:
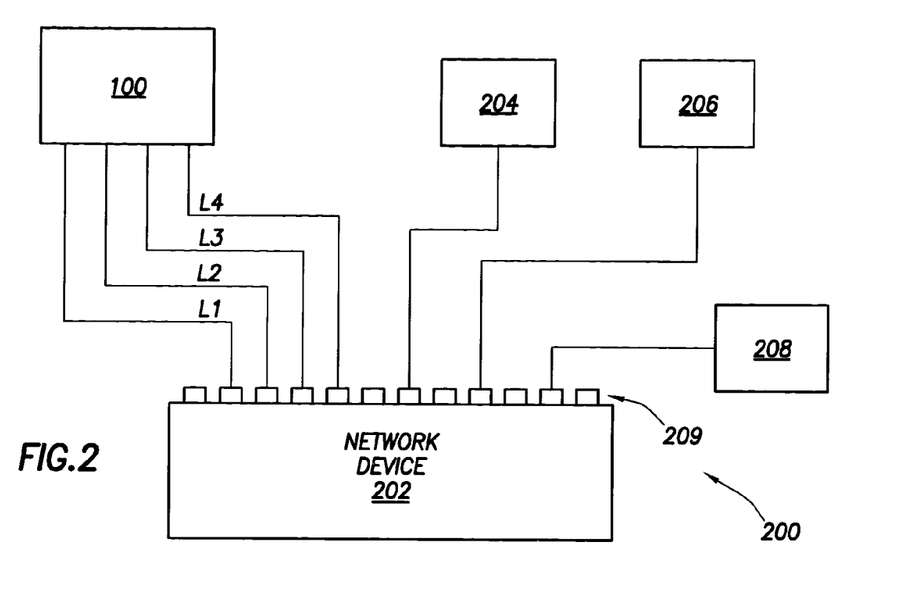
FIG. 2 is a block diagram of a network including the computer system of FIG. 1 and other devices coupled to a network device.

Referring now to FIG. 2, an exemplary block diagram is shown of a network 200 that permits the computer system 100 to communicate with one or more other devices, such as devices 204, 206 and 208 as shown. The devices 204, 206 and 208 may be of any type, such as another computer system, a printer or other peripheral device, or any type of network device, such as a hub, a repeater, a router, or a router. The computer system 100 and the devices 204-208 may be coupled together through a multi-port network device 202, such as a hub, switch or router, where each device 100, 204-208 is coupled to one or more respective ports 209 of the network device 202. The network 200, including the network device 202, the computer system 100 and each of the devices 204-208, may operate according to any suitable network architecture (e.g., Ethernet). The network 200 may form any type of Local Area Network ("LAN") or Wide Area Network ("WAN"), and may comprise an intranet and be connected to the Internet if desired.

Referring to FIGS. 1 and 2, the computer system 100 may couple to the network device 202 via a plurality of links L1, L2, L3 and L4. The NICs N1-N4 each may include a port to provide a respective link L1-L4. The computer system 100 may be coupled to the network device 202 via any suitable number of links (one or more). Also, each NIC may have any suitable number of ports (one or more).

The use of multiple links to a single device, such as the computer system 100, may enable any one or more of a variety of features, such as fault tolerance or load balancing. For fault tolerance, one of the links, such as link L1 and its corresponding NIC N1, may be active while one or more of the remaining NICs and links maybe in a standby mode. If the active link fails or is otherwise disabled for any reason, the computer system 100 may switch to another NIC and corresponding link, such as NIC N2 and link L2, to continue or maintain communications. Although two links may provide sufficient fault tolerance, three or more links may provide additional fault tolerance in the event two or more links become unusable. For load balancing, the computer system 100 may distribute data among the redundant links according to any desired criterion or criteria to increase data throughput. Additional information regarding the use of the computer system 100 for fault tolerance and/or load balancing may be found in U.S. Pat. Nos. 6,381,218; 6,272,113, and 6,229,538, all of which are incorporated herein by reference.

Figure 3:
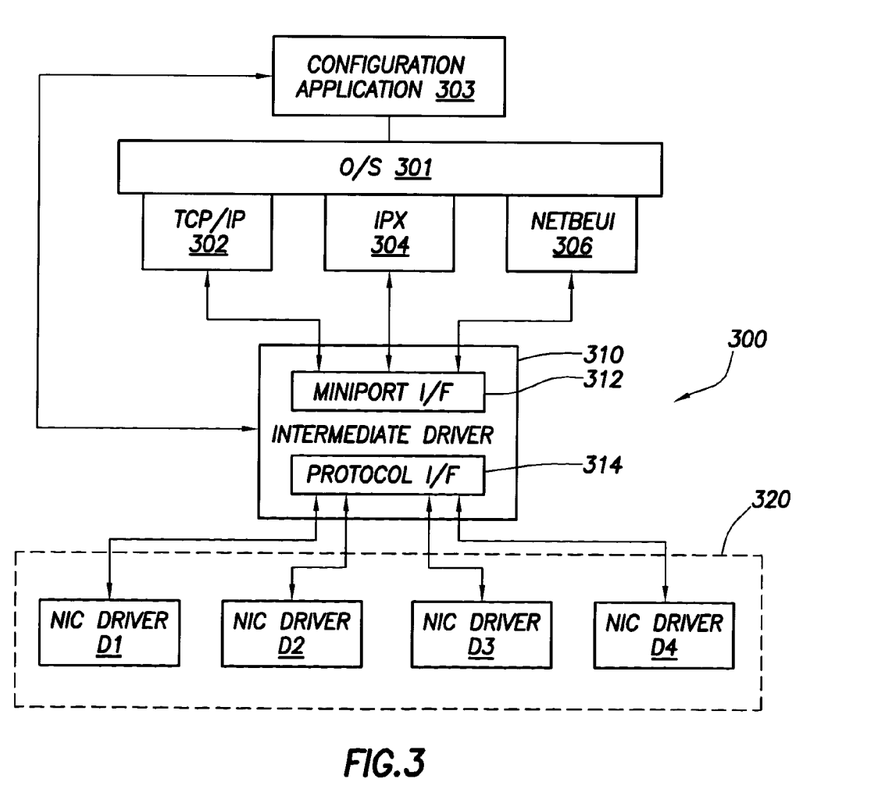
FIG. 3 is a block diagram of a controller system in the computer system of FIG. 1.

FIG. 3 is an exemplary block diagram of a controller system 300 installed on the computer system 100 and implemented according to various embodiments of the invention. The controller system 300 may coordinate the operation of two or more NICs to act as a single virtual or logical device. Such a group of NICs may be referred to as a "team" and may have a single address to permit the team of NICs to appear as a single NIC to logic external to the team. As shown in FIG. 3, four NIC drivers D1-D4 are installed on the computer system 100, each for supporting and enabling communications with a respective port of one of the NICs N1-N4. The computer system 100 may be installed with an appropriate operating system ("O/S") 301 that supports networking. The O/S 301 may support one or more communication protocols, such as Transmission Control Protocol/Internet Protocol ("TCP/IP") 302, Internet Protocol eXchange ("IPX") 304 or NETwork BIOS End User Interface ("NetBEUI") 306. Each protocol may bind with a NIC driver to establish a communication link between a computer and the network supported by the bound NIC. The controller system 300 also may include an intermediate driver 310 to function as a stand alone protocol service to automatically determine which NICs may be teamed together, to validate an existing team, and otherwise to manage NICs and teams.

Each of the protocols 302-306 may bind to a miniport interface ("I/F") 312, and each of the NIC drivers D1-D4 may bind to a protocol I/F 314, of the intermediate driver 310. In this manner, the intermediate driver 310 may appear as a single NIC driver to each of the protocols 302-306. Also, the intermediate driver 310 may appear as a single protocol to each of the NIC drivers D1-D4 and corresponding NICs N1-N4. The NIC drivers D1-D4 (and the NICs N1-N4) may be configured as a single team 320 as shown in FIG. 3. In general, two or more NICs may be configured into multiple teams. It is noted that a plurality of intermediate drivers 310 may be included on the computer system 100, where each binds two or more NIC drivers into a team. Thus, the computer system 100 may support multiple teams of various combinations of ports of NICs and NIC drivers.

Figure 4:
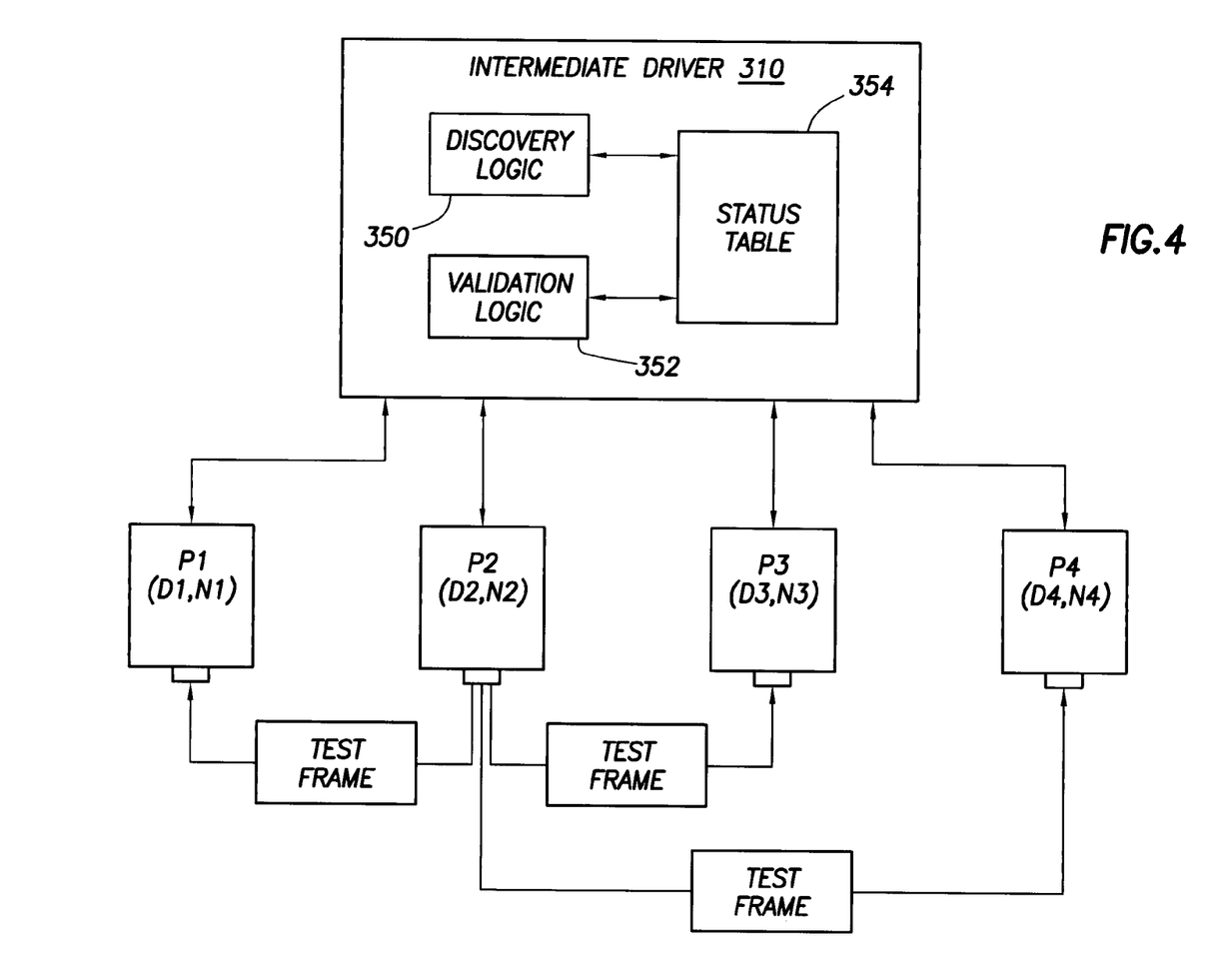
FIG. 4 is a block diagram that provides additional detail regarding the controller system of FIG. 3 in accordance with various embodiments of the invention.

Referring now to FIG. 4, intermediate driver 310 may include discovery logic 350, validation logic 310 and a status table 354. The discovery logic 350 and validation logic 310 may be implemented as code executable by CPU 104 (FIG. 1). The status table 354 may be implemented in memory subsystem 106 as a memory buffer allocated for use by the intermediate driver 310. As will be explained below, the discovery logic 350 generally determines which NICs can be teamed together. In general, and also as will be explained below, NICs that are connected to a common network can be teamed together and thus discovery logic 350 determines the network connectivity of each NIC. Once this determination is made, appropriate groups of NICs may be teamed together. Further, the configuration of the network in which a team is included may change thereby possibly changing the network connectivity of a NIC. A change in network connectivity thus may preclude a NIC from remaining as a member of its team. The validation logic 352 generally determines whether the NICs included in an already existing team may continue to be teamed together. The validation logic 352 thus provides an automatic check to determine the validity of a team. For purposes of this disclosure, a NIC, its corresponding driver, or both NIC and driver will be referred to as a "port." In FIG. 4, four ports P1-P4 are shown coupled to intermediate driver 310.

In accordance with various exemplary embodiments of the invention, two or more NICs may be included in a team if such NICs are at least part of the same network. Further, for those networks that implement virtual local area networks ("VLANs"), NICs can be teamed together if they also are part of the same VLAN. The discovery logic 350 may determine which ports are available to be teamed together in accordance with any of a variety of techniques. The discovery logic 350 may be initiated during system initialization or at other desired times including, for example, by initiation by a user via an input device (e.g., mouse 114, keyboard 116). The following discussion includes one or more of such techniques, but other discovery techniques may be implemented as well and are within the scope of this disclosure. In accordance with a suitable discovery technique, the discovery logic 350 may cause at least one port to transmit a test frame to at least one other port in the system. Generally, however, the discovery logic 350 causes each port P1-P4 to transmit a test frame to all other ports in the system. If two ports can successfully transmit and receive each others test frame, then that pair of ports belongs to the same "layer 2" network (and are not separated by a "layer 3" device such as a router). In general, two or more ports may be teamed together if they share the same layer 2 connectivity (i.e., the ports are connected to the same network).

FIG. 4 illustrates the example of port 2 transmitting a test frame to each of the other ports in system 100 including ports P1, P3, and P4. Similarly, discovery logic 350 may cause port P1 to transmit test frames to ports P2-P4, port P3 to transmit test frames to ports P1, P2 and P4, and port P4 to transmit test frames to ports P1-P3. The format of the test frames may be in accordance with any suitable format such as the format disclosed for the "heartbeat" frames in U.S. Pat. No. 6,381,218, incorporated herein by reference, although other formats may be acceptable as well. In general, the test frame may include a source address and a destination address. The source address may comprise the media access control ("MAC") address used by the transmitting port. The destination address may be a multicast address of the ports to receive the test frame as disclosed in U.S. Pat. No. 6,381,218.

As described above, the discovery logic 350 in the intermediate driver 310 may cause each port to transmit a test frame to each of the ports to determine which ports, if any, are connected to the same network (i.e., have the same layer 2 connectivity). The discovery logic 350 thus may test n(n−1)/2 pairs of ports, where "n" is the number of ports examined by the discovery logic. The discovery logic 350 may track the reception of each of the transmitted test frames as they are received by the various ports. The results of the discovery process may be stored in the status table 354. Using the information stored in the status table 354, the intermediate driver 310, via the discovery logic 350, may determine which ports are available to be formed into teams.

In accordance with various embodiments of the invention, the discovery logic 350 may characterize a pair of ports as a result of the test frames. The result of the transmission of a test frame may include any one of the following four results, although additional or different results may be possible as well. The four results may include: (1) no connectivity, (2) one-way connectivity, (3) partial connectivity, and (4) full connectivity.

"No connectivity" means that neither port in the pair of ports being examined received a test frame from the other member of the pair. "One-way connectivity" means that one member of the pair of ports being examined received the test frame, but not the other. "Partial connectivity" means that, between members of a pair of ports, one or more VLANs passed the identification test, but not all VLANs passed the test. "Full connectivity" means that each member of the pair received a test frame from the other member and that the test frame was received on some or all configured VLANs if more than one VLAN exists.

In accordance with various exemplary embodiments of the invention, the intermediate driver 310 may determine that only those ports that are characterized by full connectivity are eligible to be teamed together. In some embodiments, a pair of ports detected as having one-way connectivity may again be tested. If after a second round of discovery, the pair is still determined not to have full connectivity, the ports in that pair are determined to be ineligible to be teamed together. Ports that are characterized as having partial or no connectivity are also determined to be ineligible to be teamed together.

The discovery process may be initiated and the results of the discovery process may be presented to a user in any of a variety of manners. In general, a user may activate a configuration application 303 (FIG. 3) and interact with the application via one or more input devices, (e.g., mouse 114, keyboard 116) and one or more output devices (e.g., display 112) to initiate the discovery process and view the results. Of the variety of techniques for running the discovery process and viewing the results, one suitable technique includes a selectable software "tab" on a graphical user interface on display 112 associated with application 303. Once the user selects this tab, all currently non-teamed ports are shown on the display. The user may then select a discovery "button" on the display to cause the discovery logic 350 to begin the functionality described above.

Figure 5:
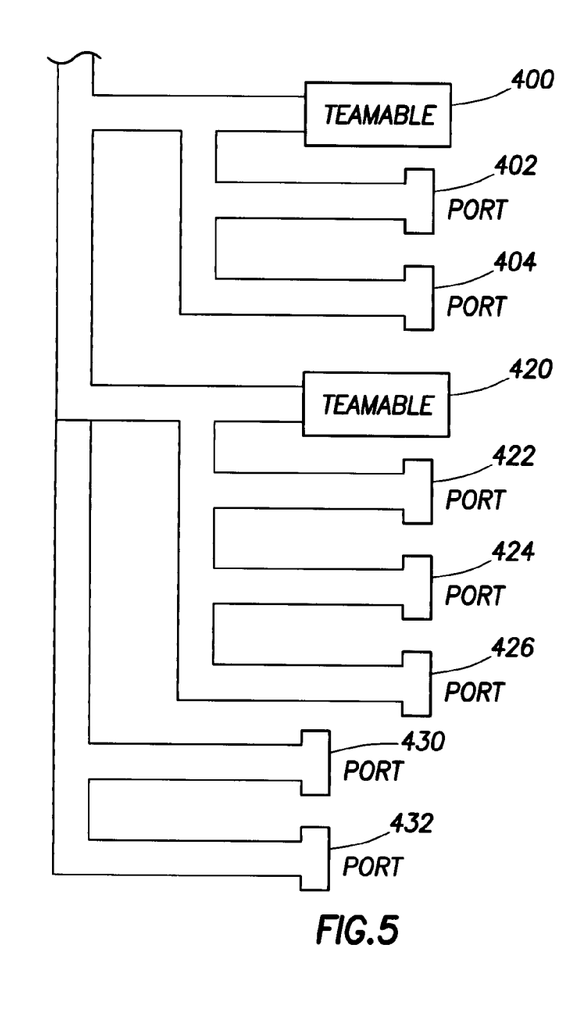
FIG. 5 is a graphic representation illustrating status of various ports in a computer system in accordance with embodiments of the invention.

The results of the discovery process may be presented to the user in any suitable manner such as that shown in FIG. 5. The exemplary graphical representation of FIG. 5 may be associated with a system that includes seven ports 402, 404, 422, 424, 426, 430 and 432. In the example of FIG. 5, the discovery logic 350 determined that ports 402 and 404 may be teamed together and ports 422-426 may be teamed together, albeit in a separate team. The discovery logic 350 further determined that ports 430 and 432 were not suitable to be included in any team. Accordingly, graphical symbols 400 and 420 indicate the existence of a team. A graphical symbol for ports 402, 404 and 422-426 are shown below each team symbol 400, 420 in a manner so as to indicate that team 400 includes ports 402 and 404, while team 420 includes ports 422-426. Being non-teamable, ports 430 and 432 are naturally not shown as being part of any team and may further be designated with text as being non-teamable. Further, the user may highlight or otherwise select a non-teamable port (e.g., ports 430 or 432) to be presented on display 112 with detailed information regarding the connectivity state of the port and other information regarding the discovery process relative the selected port.

Figure 6:
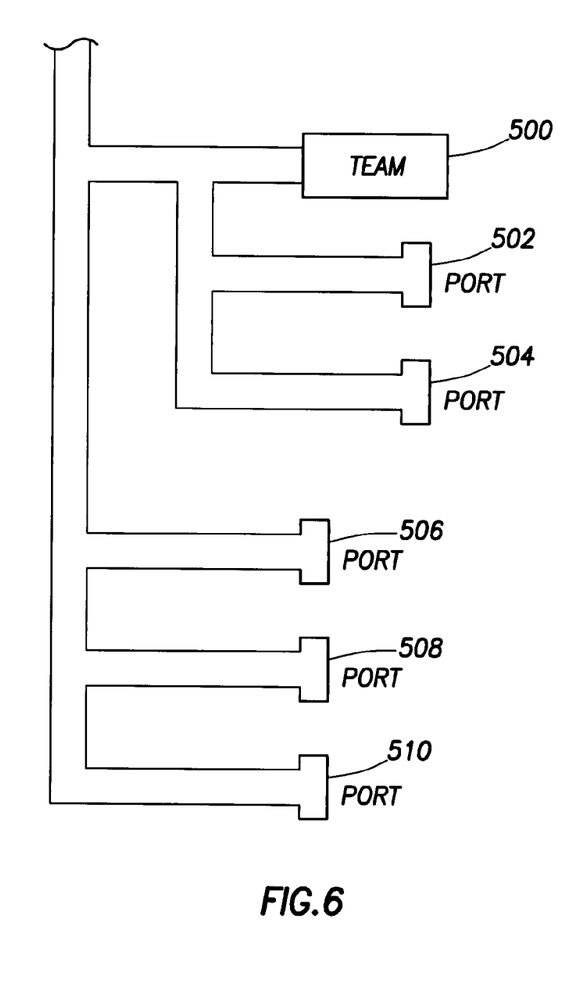
FIG. 6 is another exemplary embodiment of a graphic representation illustrating status of various ports.
Figure 7:
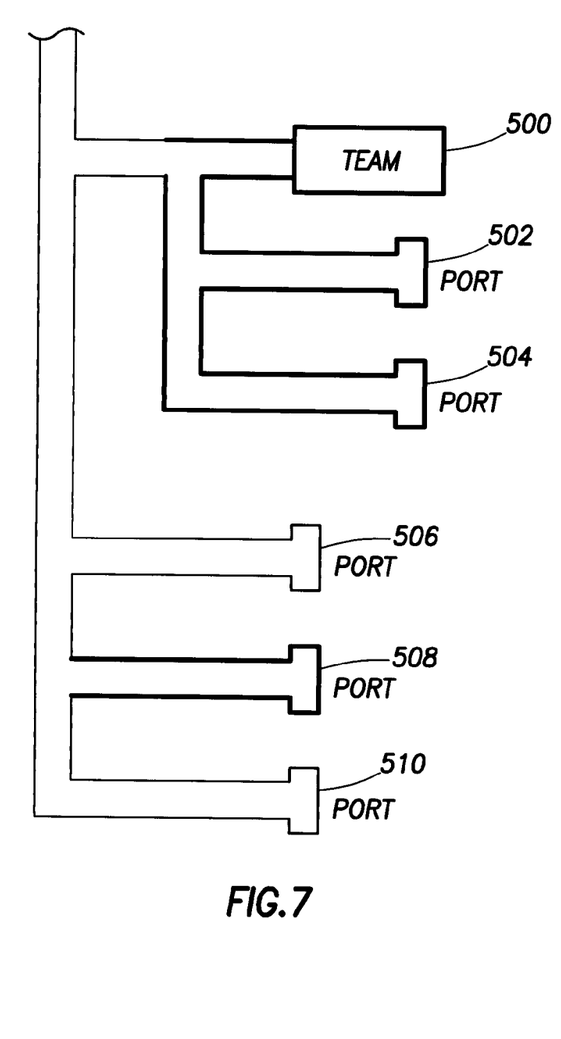
FIG. 7 is another exemplary embodiment of a graphic representation illustrating status of various ports.

In accordance with other embodiments, a tab may be provided on a graphical user interface associated with application 303. When this tab is selected, all ports, both teamed and non-teamed, may be shown on display 112. The user may select a start button to initiate the discovery logic 350. After the discovery logic 350 completes, all of the ports are shown on the display 112. Those ports that are already included in a team are shown in FIG. 6. FIG. 6 shows a team 500 including two ports 502 and 504. All other ports, such as ports 506-510, may also be shown on the display. Using mouse 114 (or other input device), the user may select or otherwise highlight a current team, such as team 500). Once selected, the appearance of the team and its member ports may change to indicate the selection. The change in appearance may be by bold line (as shown), by color, or in other manners. Alternatively, the appearance of the selected team/ports may remain the same while the appearance of all non-selected teams and ports that are not permitted to be included in the selected team may change (e.g., grayed out as is common in software applications). Further, the appearance of all other ports that are not currently part of a team, but may be members of the selected team (as determined by the discovery logic) may be the same as the selected team. For example, as shown in FIG. 7 if discovery logic 350 determines that port 508 may be teamable with existing team 500 and its ports 502-504, then when the user selects team 500, the appearance of team 500 and its ports as well as port 508 will be changed relative the other ports and teams (if any) to visually indicate that non-teamed port 508 may become a member of existing team 500.

Referring again to FIG. 4, in accordance with further embodiments of the invention, intermediate driver 310 also may be used to validate an existing team 320. The validation function of the intermediate driver may be implemented as validation logic 352. In general, the validation logic 352 assesses the connectivity status of the members of an existing team of ports. The status may be any of a plurality of statuses such as those described above (i.e., no connectivity, one-way connectivity, partial connectivity, full connectivity). To be teamed together in an exemplary embodiment, the ports have full connectivity with respect to each other and thus when the validation process is performed, the members of the team should still have full connectivity. However, conditions may have changed in the network since the team was created. For example, a switch to which at least one of the ports connects may have malfunctioned or have had its configuration altered in a way that alters the connectivity of the port(s) connected to that switch. The validation process helps to determine whether the ports previously included in the team are still legitimately teamed together. As noted below, the validation process may be initiated manually by a user or may be scheduled to run automatically at predefined times or after certain conditions are detected in the network. (e.g., a detected change in network topology).

The validation process is generally similar to the discovery process described above, but may be applied only to teamed ports. The validation process may be applied to one team if only one team exists in the system 100. The process also may be applied to each of multiple teams in the event that multiple teams exist. In general, for each team to be validated, the intermediate driver's validation logic 352 causes each pair of ports in the team to transmit test frames in both directions to determine the connectivity state between the port pair. In accordance with at least some embodiments, a state other than the full connectivity state indicates that one or both of the ports may not be suitable to remain as part of the team.

Figure 8:
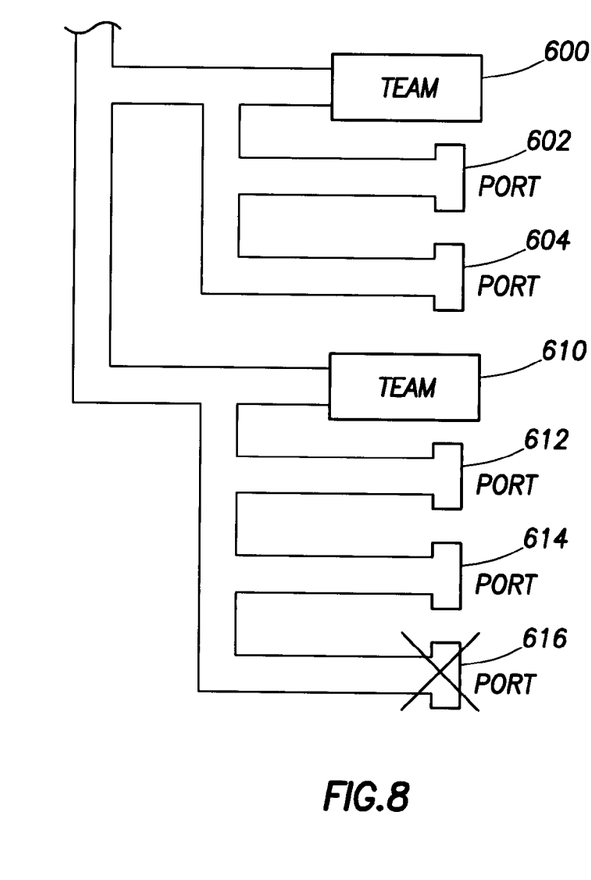
FIG. 8 is another exemplary embodiment of a graphic representation illustrating status of various ports.

The results of the validation process may be presented to the user in a variety of manners. For instance, FIG. 8 shows an exemplary graphical representation of two teams 600 and 610. Team 600 includes two ports 602 and 610 while team 610 includes three ports 612-616. Upon execution of the validation logic 352, the validation logic determines that port 616 is no longer entitled to be a member of team 610. This condition is shown on the graphical display with an "X" through port 616. Other symbols may be used as well. Further, the user may highlight or otherwise select port 616 to have more detail shown on the display as to why port 616 failed the validation process.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A network controller system, comprising:
a plurality of network ports; and
a driver system that operates the plurality of network ports;
the driver system determining which of said network ports can be combined together to form a team having a common team network address to be used by external network logic, the driver system causes all of the plurality of network ports not currently operated as part of a team to transmit test packets to all other ports to determine whether said non-teamed ports can be combined in a team;
wherein each network port in the team is associated with a different network interface controller (NIC), said NICs associated with said common team network address.

2. The system of claim 1 wherein the network ports include a first network port and a second network port and all of the network ports couple to at least one network device, and wherein the driver system causes the first network port to transmit a packet to the second network port and the second network port to transmit a packet to the first network port to determine if the first and second network ports are coupled to the same network.

3. The system of claim 1 wherein each of said network ports transmit packets to all of said other network ports to determine which of said network ports are coupled to the same network.

4. The system of claim 1 wherein said driver system includes discovery logic that causes at least one pair of network ports to transmit test packets between each member of the pair and said discovery logic determines whether each test packet is received by one port in said pair of network ports.

5. The system of claim 4 wherein said discovery logic determines that both members of said pair of network ports can be teamed together if both of said test packets are received by the ports.

6. The system of claim 4 wherein said discovery logic causes each of said network ports to transmit a test packet to all networks and determines which of test packets are received.

7. The system of claim 6 wherein, based on determining which of said test packets are received, said discovery logic determines which of said network ports can be teamed together.

8. The system of claim 6 wherein said discovery logic determines that at least one team can be formed from said network ports.

9. The system of claim 6 wherein said discovery logic determines that at least two teams can be formed from said network ports.

10. The system of claim 6 wherein said discovery logic determines a status associated with a pair of network ports resulting from transmission of a pair of test packets between the network ports in the pair, said status comprising a status selected from the group consisting of no connectivity, one-way connectivity, partial connectivity and full connectivity.

11. The system of claim 1 wherein the driver system determines that two or more network ports can be combined together to form a team if said two or more network ports have common layer 2 connectivity.

12. The system of claim 11 wherein a plurality of said network ports are combined to form a team and said driver system determines whether all of said networks in said team continue to be eligible to remain in said team.

13. The system of claim 12 wherein said driver system includes validation logic that causes all of said network ports in said team to transmit test packets to all other network ports in said team to determine if all of said network ports in said team have the same layer 2 connectivity.

14. A computer system adapted to couple to one or more network devices, comprising:
a processor;
a plurality of network interface controllers (NICs) coupled to said processor; and
a controller subsystem that operates the plurality of NICs, the controller subsystem determining which of said NICs are combinable as a team, the team is assigned a network address to be used by external logic;
wherein said controller subsystem causes all of said NICs not currently operated as part of a team to transmit test packets to all other NICs to determine whether said non-teamed NICs can be combined in a team.

15. The system of claim 14 wherein the NICs include a first NIC and a second NIC and all of the NICs couple to at least one NIC, and wherein the controller subsystem causes the first and second NICs to trade test packets to determine if the first and second NICs are coupled to a common network.

16. The system of claim 14 wherein said controller subsystem causes at least one pair of NICs to transmit test packets between each member of the pair and determines whether each test packet is received by one NIC in said pair of NICs.

17. The system of claim 16 wherein said controller subsystem causes each of said NICs to transmit a test packet to all networks to which the computer system couples and determines which of test packets are received, and the test packets that are received determine which of said NICs can be combined together as a team.

18. The system of claim 14 further including an output device coupled to the processor and wherein a graphical representation showing which NICs can be combined together as a team is shown on the output device.

19. The system of claim 14 wherein some of the plurality of NICs are combined as a team and said controller subsystem determines whether all of said NICs in said team continue to be eligible to remain in said team.

20. The system of claim 19 wherein said controller subsystem causes all of said NICs in said team to transmit test packets to all other NICs in said team to determine if all of said NICs in said team have the same layer 2 connectivity.

21. A network controller system, comprising:
a plurality of network ports; and
means for determining which of said network ports can be combined together to form a team having a common team network address to be used by external network logic;
wherein each network port in the team is associated with a different network interface card (NIC), said NICs associated with the common team network address;
wherein said means for determining causes all of said network ports not currently operated as part of a team to transmit test packets to all other network ports to determine whether said non-teamed network ports can be combined in a team.

22. The system of claim 21 wherein the network ports include a first network port and a second network port and all of the network ports couple to at least one network device, and said means includes means for causing the first network port to transmit a packet to the second network port and the second network port to transmit a packet to the first network port and for determining if the first and second network ports are coupled to the same network.

23. A computer system, comprising:
a processor;
a plurality of ports coupled to said processor, said ports adapted to connect to a network, the network to which one port connects being the same or different as the network to which another port connects, at least two of said ports are operated as a team having a single team network address to be used by external network logic; and
logic coupled to said ports, said logic determines whether said ports in said team continue to be eligible to be operated in said team;
wherein each port in the team is associated with a different network interface controller (NIC), said NICs associated with the single team network address;
wherein said logic causes all of said ports not currently operated as part of a team to transmit test packets to all other ports to determine whether said non-teamed ports can be operated in a team.

24. The computer system of claim 23 wherein eligibility is determined based on transmitting test packets between pairs of ports in said team.

25. The computer system of claim 23 wherein said logic determines which of said ports may be operated as a team.

26. The computer system of claim 23 further including a display coupled to the processor on which information regarding which ports in said team can remain in the team and which cannot remain in the team.

27. A method usable in a system comprising a plurality of ports, said method comprising:
transmitting packets from each non-teamed port to all of the plurality of ports;
determining whether said packets are received;
determining which of said non-teamed ports may be operated in a team and which of said non-teamed ports, if any, are ineligible to be operated in said team;
providing information that indicates which non-teamed ports are eligible to be operated in said team and which non-teamed ports, if any, are ineligible to be operated in said team; and
grouping into a team the non-teamed ports that are eligible to be operated in said team, each of said eligible non-teamed ports is associated with a different network interface card (NIC), said NICs having a common team network address to be used by external devices.

28. The method of claim 27 wherein determining which of said non-teamed ports may be operated in said team and which of said non-teamed ports, if any, are ineligible to be operated in said team includes determining that a pair of non-teamed ports may be operated in said team if at least some of said packets were received by both non-teamed ports from the other of said pair's ports.

* * * * *